United States Patent Office.

CHARLES EDOUARD CHAMBERLAND, OF PARIS, FRANCE.

FILTERING COMPOUND.

SPECIFICATION forming part of Letters Patent No. 336,385, dated February 16, 1886.

Application filed May 11, 1885. Serial No. 165,054. (No specimens.) Patented in England March 17, 1885, No. 3,423.

*To all whom it may concern:*

Be it known that I, CHARLES EDOUARD CHAMBERLAND, doctor of sciences, of 14 rue Vauquelin, Paris, France, have invented certain new and useful Improvements in Filtering Compounds; and I do hereby declare that the following is a full, clear, and exact description of the same.

The means hitherto employed for filtering water ordinarily consist in the use of burned brick, powdered substances, and various other materials, but which, either from the character of the materials themselves or from the manner in which they are used or compounded, are not fully satisfactory where great thoroughness in filtering is requisite. However efficient the named substances may be for filtering purposes, yet they do not, however, retain all germs or microbes or extremely-fine organisms which are in suspension in the water or other liquid, such as in infected blood taken from an animal having died of splenic fever, or generally any blood infected with microbes.

Wines, vinegars, and other like beverages have been subjected to a certain degree of heat for the purpose of destroying any germs therein contained, because the means hitherto devised are inefficient in retaining said germs by way of filtration.

My invention is designed more completely to hold back and retain such germs; and it consists of a compound to be used for filtering water, wines, beverages, and all liquids generally.

The compound is formed, substantially, of pipe-clay or any other suitable clay and porcelain-earth, or its equivalents, hereinafter named. The clay is diluted in water, and then mixed with the porcelain-earth or its equivalents. The porcelain-earth is ground or reduced to fine powder in any suitable mill, after having been previously baked in any suitable kiln. The proportions are from twenty to forty per cent. of clay to sixty to eighty per cent. of porcelain-earth or its equivalents. They may, however, vary more or less. I wish it, however, to be understood that I do not limit myself to the above-named substances, for the same or very much the same result may be attained by using, for instance, silex, magnesia, or its equivalent, instead of porcelain-earth.

The above-described compound is preferably intended for filtering liquids under pressure, owing to its being porous but to a small extent, and for this purpose any suitable filtering apparatus may be employed.

The manufacture of the filtering-bodies may be effected by casting, molding, or turning, as in the manufacture of pottery-ware. The filtering-body is then baked in a biscuit or other kiln, in the usual way, the temperature at which it is baked ranging, say, from 1,850° to 2,400° Fahrenheit.

A filtering-body produced from the above compound is homogeneous and fulfills the required conditions for filtering the hereinbefore-named substances, and thereby obtaining the results herein mentioned.

I do not wish to be understood as laying claim, broadly, to the materials hereinabove mentioned as a filtering compound, but only when they are treated as above specified.

I claim—

A filtering compound formed of porcelain-earth baked and reduced to a powder and pipe-clay, combined in the proportions set forth, the said compound being baked, substantially as set forth.

In witness whereof I have hereunto signed my name in the presence of two subscribing witnesses.

CHARLES EDOUARD CHAMBERLAND.

Witnesses:
R. H. BRANDON,
A. LE CANCE.